US012802976B2

(12) United States Patent
Roh et al.

(10) Patent No.: US 12,802,976 B2
(45) Date of Patent: Nov. 17, 2026

(54) POSITIVE ELECTRODE ACTIVE MATERIAL CONTAINING SPINEL COMPOSITE SOLID SOLUTION OXIDE, METHOD FOR MANUFACTURING SAME, AND LITHIUM SECONDARY BATTERY INCLUDING SAME

(71) Applicant: TOP MATERIAL CO., LTD., Gyeonggi-do (KR)

(72) Inventors: Whan Jin Roh, Seoul (KR); Young Bae Roh, Gyeonggi-do (KR); Byung Su Jung, Gyeonggi-do (KR); Hyunmin Kim, Gyeonggi-do (KR); Woogyu Han, Gyeonggi-do (KR)

(73) Assignee: TOP MATERIAL CO., LTD., Gyeonggi-do (KR)

( * ) Notice: Subject to any disclaimer, the term of this patent is extended or adjusted under 35 U.S.C. 154(b) by 1063 days.

(21) Appl. No.: 17/920,459

(22) PCT Filed: Mar. 16, 2021

(86) PCT No.: PCT/KR2021/003263
§ 371 (c)(1),
(2) Date: Apr. 5, 2023

(87) PCT Pub. No.: WO2021/215670
PCT Pub. Date: Oct. 28, 2021

(65) Prior Publication Data

US 2023/0238524 A1 Jul. 27, 2023

(30) Foreign Application Priority Data

Apr. 21, 2020 (KR) ........................ 10-2020-0048013

(51) Int. Cl.

| | |
|---|---|
| ***H01M 4/505*** | (2010.01) |
| ***C01G 53/54*** | (2025.01) |
| ***H01M 4/131*** | (2010.01) |
| ***H01M 4/525*** | (2010.01) |
| ***H01M 10/052*** | (2010.01) |

(Continued)

(52) U.S. Cl.
CPC ............ *H01M 4/505* (2013.01); *C01G 53/54* (2013.01); *H01M 4/131* (2013.01); *H01M 4/525* (2013.01);
(Continued)

(58) Field of Classification Search
None
See application file for complete search history.

(56) References Cited

U.S. PATENT DOCUMENTS 8,734,998 B2 * 5/2014 Kagei ................ C01G 45/1242 429/231.95
10,442,699 B2 * 10/2019 Kagei .................... C01D 15/02
2008/0107968 A1 5/2008 Patoux et al.

FOREIGN PATENT DOCUMENTS

CN 102683668 A 9/2012
CN 102718264 A 10/2012
(Continued)

OTHER PUBLICATIONS

Kosova, N. V. et al., "Peculiarities of structure, morphology, and electrochemistry of the doped 5-V spinel cathode materials LiNiO. 5—xMn1.5—yMx+YO4 (M=Co, Cr, Ti; x+y=0.05) prepared by mechanochemical way," Journal of Solid State Electrochemistry, vol. 20, No. 1, 2016, pp. 235-246.
(Continued)

*Primary Examiner* — Amanda C. Walke
(74) *Attorney, Agent, or Firm* — Dilworth & Barrese, LLP.; Michael J. Musella, Esq.

(57) ABSTRACT

The present invention relates to a positive electrode active material containing a spinel composite solid solution oxide, a method for manufacturing same, and a lithium secondary battery including the same. The spinel composite solid solution oxide contains cubic ($P4_332$) and face-centered cubic (Fd-3*m*) in an optimized solid solution ratio in the crystal, and a low content of lithium nickel oxide ($Li_zNi_{1-z}O$) is combined. A positive electrode active material containing the spinel composite solid solution oxide provides excellent output characteristics while having stable
(Continued)

cycle-life characteristics according to the type and content of doping elements replacing transition metals, the synthesis temperature, and the amount of impurities generated.

4 Claims, 11 Drawing Sheets

(52) U.S. Cl.
CPC ....... *H01M 10/052* (2013.01); *C01P 2002/32* (2013.01); *C01P 2002/54* (2013.01); *C01P 2002/72* (2013.01); *C01P 2002/76* (2013.01); *C01P 2002/77* (2013.01); *C01P 2006/11* (2013.01); *C01P 2006/12* (2013.01); *C01P 2006/40* (2013.01)

(56) References Cited

FOREIGN PATENT DOCUMENTS

| | | | | | |
|---|---|---|---|---|---|
| CN | 104112856 | A | | 10/2014 | |
| CN | 2017522702 | A | | 8/2017 | |
| CN | 107681146 | A | | 2/2018 | |
| CN | 109863630 | A | | 6/2019 | |
| JP | 2005-322480 | A | | 11/2005 | |
| JP | 2006196293 | A | | 7/2006 | |
| JP | 2009505929 | A | | 2/2009 | |
| JP | 2012-216549 | A | | 11/2012 | |
| JP | 2018190720 | A | * | 11/2018 | |
| KR | 10-2011-0044936 | A | | 5/2011 | |
| KR | 10-2019-0062432 | A | | 6/2019 | |
| KR | 10-2168640 | B1 | | 10/2020 | |
| WO | 2015/075521 | A1 | | 5/2015 | |
| WO | WO-2015174225 | A1 | * | 11/2015 | ............ H01M 4/525 |
| WO | 2016011962 | A1 | | 1/2016 | |

OTHER PUBLICATIONS

Zhong G B et al.; : "Effects of Al substitution for Ni and Mn on the electrochemical properties of LiNiMnO"; Electrochimica Acta, Elsevier, Amsterdam, vol. 56, No. 18; Mar. 27, 2011, pp. 6554-6561.

Ding Yuan-Li et al.; "Single-crystalline nanotubes of spinel lithium nickel manganese oxide with lithium titanate anode for high-rate lithium ion batteries"; Journal of Power Sources, Elsevier, Amsterdam, NL, vol. 236, Feb. 26, 2013; pp. 1-9.

* cited by examiner

C-rate comparision

C-rate comparision

POSITIVE ELECTRODE ACTIVE MATERIAL CONTAINING SPINEL COMPOSITE SOLID SOLUTION OXIDE, METHOD FOR MANUFACTURING SAME, AND LITHIUM SECONDARY BATTERY INCLUDING SAME

TECHNICAL FIELD

The present invention provides a positive electrode active material containing a high voltage spinel composite solid solution oxide having a discharge voltage of 4.5 V or more, a method for manufacturing same, and a lithium secondary battery including the same.

BACKGROUND ART

Lithium secondary batteries have been used as a power source for numerous everyday devices, since Sony first adopted them as a power source of its own camcorder camera in 1991, and now, development of a positive electrode active material with high energy density is required with a growing demand on new power sources for electric vehicles, power storage devices, and the like.

Currently, the development of a positive electrode active material with high energy density in the battery industry is being made toward two directions of a nickel (Ni)-rich high-capacity positive electrode active material containing more nickel (NCM622, NCM811) and a high voltage spinel positive electrode active material exhibiting a high discharge voltage of 4.5 V or more.

Among positive electrode materials known so far, a high voltage positive electrode material exhibiting discharge characteristics of 4.5 V or more includes a spinel structure compound ($LiM_zMn_{2-x}O_4$), an inverse spinel structure ($LiNiVO_4$), a $LiCoNiPO_4$ polyanion material, and the like. These high voltage positive electrode materials have smaller capacity than conventional nickel-rich high-capacity positive electrode materials with 4 V but have a high voltage and thus may not only realize high energy density but also reduce the number of batteries in series, for power devices that require a high voltage, such as electric vehicles, power storage devices, and the like, dramatically reducing a battery pack production cost.

Among the high voltage positive electrode materials, research on a high-voltage spinel positive electrode active material is being focused on as a material minimizing a flat potential in a 4 V Class and showing large capacity in a 5 V Class. The high voltage spinel positive electrode active material uses manganese (Mn) as a main component but does not use cobalt (Co), which is sensitive in terms of cost and supply, and limitedly uses nickel (Ni) and thus has a low production cost and is environmentally friendly, but in order to commercialize this positive electrode active material, deterioration of cycle-life due to elution of Mn and Ni at a high voltage of 4.5 V or more needs to be solved, and in addition, since this positive electrode material has relatively lower electrical conductivity than a nickel-rich positive electrode material, structural stability and electrical conductivity of the material need to be increased through doping of a heterogeneous metal or optimization of crystal structures.

The high voltage spinel positive electrode active material has a crystal structure of an ordering primitive cubic close pack ($P4_332$), in which Mn ions are all +4, and nickel and manganese, transition metals, located at octahedral sites are in a regular arrangement of 1:3, and a disordering face-centered cubic (Fd-3m), in which +4 and +3 Mn ions are mixed, and Li is disorderly present at 8a sites, while Ni and Mn are disorderly present at 16d sites, and oxygen (O) occupies 32e sites. These two crystal structures may appear with a different occupancy rate through a different manufacturing process of the spinel positive electrode active material or a doping process of a heterogeneous element, through which a concentration of an impurity (lithium nickel oxide, $Li_zNi_{1-z}O$) may be different, and in addition, a full width at half maximum, a lattice constant, and a lattice volume may vary. Such differences may bring about many changes in a cycle-life and output characteristics of a battery.

In general, an oxidation reduction reaction potential of a high voltage spinel positive electrode active material is known to have a 4 V discharge region due to $Ni^{+2}/N^{+4}$ and a 4.7 V discharge region due to $M^{+3}/M^{+4}$, but in fact, when oxygen deficiency occurs, while the positive electrode material is fired at a high temperature, as a potential of a portion of Mn is changed from +4 to +3, a lithium nickel oxide ($Li_zNi_{1-z}O$) is produced due to an irregular reaction and complexed in crystals (Reaction Scheme 1). In addition, the high voltage spinel positive electrode active material is known to have a nickel solid solution limit up to 0.5 moles, and when more nickel is added, nickels exceeding the solid solution limit are known to be complexed in crystals into a lithium nickel oxide (Reaction Scheme 2).

$$LiNi_{0.5}Mn_{1.5}O_4 \Leftrightarrow qLi_zNi_{1-z}O + rLiNi_{0.5-w}Mn_{1.5+w}O_4 + sO_2 \text{ (at high T)} \quad \text{[Reaction Scheme 1]}$$

$$[Li^+][Ni^{2+}]_x[Mn^{3+}]_{1-2x}[Mn^{4+}]_{1+x}[O^2]_4 \Rightarrow [Li^{30}]_{2x}[Ni^{2+}]_x[Mn^{4+}]_{2-x}[O^2]_4 + (1-2x)Li^+ + (1-2x)e \text{ (at 4.1 V plateau)}$$

$$[Li^+]_{2x}[Ni^{2+}]_x[Mn^{4+}]_{2-x}[O^2]_4 \Rightarrow [Ni^{4+}]_x[Mn^{4+}]_{2-x}[O^2]_4 + 2xLi^{30} + 2xe \text{ (at 4.7 plateau)} \quad \text{[Reaction Scheme 2]}$$

The cubic structure in which nickel and manganese are regularly arranged has a slower diffusion rate of lithium ions than the face-centered cubic structure in which nickel and manganese are relatively irregularly arranged, and also lower electrical conductivity of a material, which deteriorates battery chemical performance, and in addition, the lithium nickel oxide itself is an insulator and does not participate in a battery chemical reaction and thus affects battery capacity and cycle-life characteristics. Accordingly, electrochemical performance of the high voltage spinel positive electrode active material needs to be further improved through a manufacturing process and structural control.

DISCLOSURE

Technical Problem

In the spinel positive electrode active material, when the synthesis temperature is increased to improve crystallinity, an oxygen deficiency problem may increase and a concentration of lithium nickel oxide as an impurity may increase, which may cause a cycle-life problem and a decrease in output.

An object of the present invention is to provide a positive electrode active material in which occupancy of impurities is lowered while improving crystallinity by increasing the synthesis temperature of the spinel composite solid solution oxide.

Another object of the present invention is to provide a method for manufacturing a positive electrode active material.

Another object of the present invention is to provide a lithium secondary battery having a stable cycle-life and excellent high output characteristics.

Technical Solution

According to an embodiment of the present invention, a positive electrode active material includes a spinel composite solid solution oxide represented by Chemical Formula 1, wherein in the spinel composite solid solution oxide, a weight of lithium nickel oxide ($Li_zNi_{1-z}O$, $0<z\leq 0.2$) is 0 wt % to 2 wt % based on a total weight of the spinel composite solid solution oxide in Rietveld analysis in the XRD spectrum.

$$Li_{1+a}Ni_{1/2-x/2}Mn_{3/2-x/2}M_xO_4 \quad \text{[Chemical Formula 1]}$$

In Chemical Formula 1, M is any one doping element selected from Co, Mg, Ti, Al, Ba, Cr, Fe, Mo, W, Zr, Y, Nb, and a combination thereof, $0\leq a\leq 0.1$, and $0<x\leq 0.1$.

The weight of the lithium nickel oxide may be 0.01 wt % to 2 wt % based on the total weight of the spinel composite solid solution oxide.

It may include a spinel composite solid solution oxide represented by Chemical Formula 2.

$$Li_{1+a}Ni_{1/2-x/2}Mn_{3/2-x/2}Ti_xO_4 \quad \text{[Chemical Formula 2]}$$

In Chemical Formula 2, $0\leq a\leq 0.1$ and $0<x\leq 0.1$.

In Chemical Formula 1, 0.0255)(50.05.

The spinel composite solid solution oxide may have a tap density of 1.2 g/cc to 2.2 g/cc, and a specific surface area of 0.5 $m^2/g$ to 2.5 $m^2/g$.

When the spinel composite solid solution oxide is analyzed by Rietveld analysis in an XRD spectrum, occupancy of a cubic ($P4_332$) in the crystal calculated by Equation 1 is 0 to 0.1, occupancy of a face-centered cubic (Fd-3m) in the crystal calculated by Equation 2 is 0.9 to 1, and occupancy of impurities (lithium nickel oxide, $Li_zNi_{1-z}O$) in the crystal calculated by Equation 3 is 0 to 0.02.

$$\text{occupancy of cubic } (P4_332)=A_{P4332}/(A_{P4332}+A_{Fd\text{-}3m}+Li_zNi_{1-z}O) \quad \text{[Equation 1]}$$

$$\text{occupancy of face-centered cubic (Fd-3m)}=A_{Fd\text{-}3m}/(A_{P4332}+A_{Fd\text{-}3m}+Li_zNi_{1-z}O) \quad \text{[Equation 2]}$$

$$\text{occupancy of impurities } (Li_zNi_{1-z}O)=Li_zNi_{1-z}O/(A_{P4332}+A_{Fd\text{-}3m}+Li_zNi_{1-z}O) \quad \text{[Equation 3]}$$

In Equations 1 to 3, $A_{P4332}$ is wt % of the cubic ($P4_332$), $A_{Fd\text{-}3m}$ is wt % of the face-centered cubic (Fd-3m), and $Li_zNi_{1-z}O$ is wt % of the impurities ($Li_zNi_{1-z}O$).

When the spinel composite solid solution oxide is analyzed by Rietveld analysis in an XRD spectrum, a lattice constant a (Å) value of a spinel structure is greater than 8.1640 and less than 8.1900.

When the spinel composite solid solution oxide is analyzed by Rietveld analysis in an XRD spectrum, a full width at half maximum (FWHM) may satisfy Equation 4.

$$0.01\leq \text{FWHM(deg)}\leq 0.20((hkl)=(111),\ 2\theta=18 \text{ to } 20), \text{ and}$$

$$0.01\leq \text{FWHM(deg)}\leq 0.25((hkl)=(222),\ 2\theta=43 \text{ to } 45). \quad \text{[Equation 4]}$$

According to another embodiment of the present invention, a method of manufacturing a positive electrode active material containing a spinel composite solid solution oxide represented by Chemical Formula 1 includes preparing a mixed salt by dry-mixing a manganese salt, a nickel salt, and a lithium salt, preparing a slurry by mixing the mixed salt and a compound containing the doping element with a solvent and then wet-pulverizing the slurry until D50 of solid mixture particles in the slurry becomes 100 nm to 300 nm to prepare a powder, calcining the powder at 400° C. to 600° C. for 4 hours to 12 hours to remove organic materials unnecessary for the reaction, and firing particles formed in the calcining step at 700° C. to 950° C. for 6 hours to 24 hours.

$$Li_{1+a}Ni_{1/2-x/2}Mn_{3/2-x/2}M_xO_4 \quad \text{[Chemical Formula 1]}$$

In Chemical Formula 1, M is any one doping element selected from Co, Mg, Ti, Al, Ba, Cr, Fe, Mo, W, Zr, Y, Nb, and a combination thereof, $0\leq a\leq 0.1$, and $0<x\leq 0.1$.

The lithium salt may be any one compound selected from a lithium-containing oxide, hydroxide, nitrate, carbonate, acetate, and a mixture thereof.

The manganese salt may be any one compound selected from a manganese-containing oxide, hydroxide, nitrate, carbonate, acetate, and a mixture thereof.

The nickel salt may be any one compound selected from nickel-containing oxide, hydroxide, nitrate, carbonate, acetate, and a mixture thereof.

The compound containing the doping element may be an oxide, a hydroxide, a nitrate, a carbonate, an acetate, and a mixture thereof which contain any one doping element selected from Co, Mg, Ti, Al, Ba, Cr, Fe, Mo, W, Zr, Y, Nb, and a combination thereof.

The positive electrode active material may include secondary particles having an average particle diameter of 5 micrometers to 30 micrometers, which are formed by aggregating primary particles having an average particle diameter of 100 nm to 500 nm.

According to another embodiment of the present invention, a lithium secondary battery includes: a positive electrode including the positive electrode active material; a negative electrode including a negative electrode active material; and an electrolyte between the positive electrode and the negative electrode.

Advantageous Effects

The positive electrode active material containing the spinel composite solid solution oxide of the present invention improves crystallinity by increasing the synthesis temperature and lowers the occupancy of impurities, thereby providing stable cycle-life and excellent high output characteristics.

MODE FOR INVENTION

Figure 1:
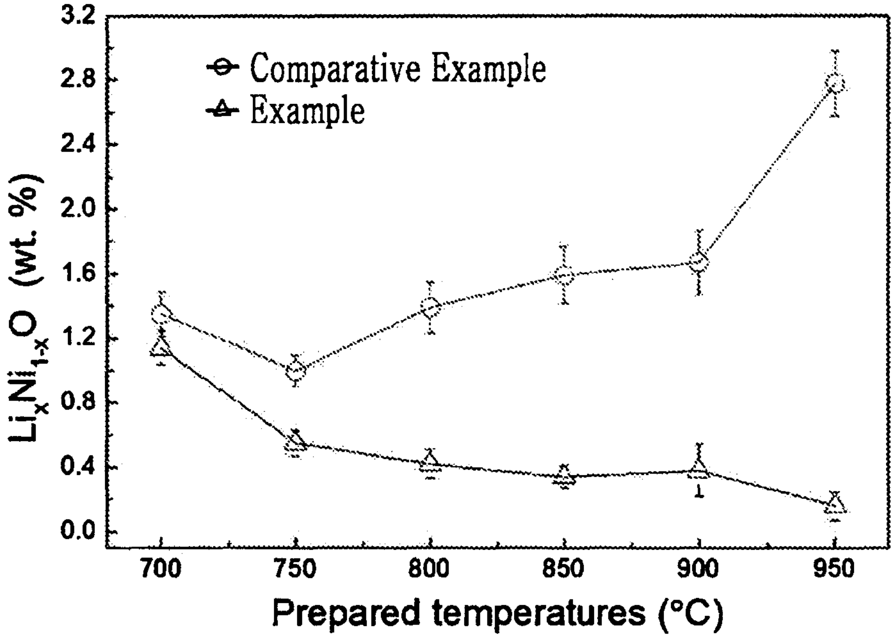
FIG. 1 is a graph showing a content of impurities (lithium nickel oxide) according to the firing temperature of the spinel composite solid solution oxide prepared in examples and comparative examples.
Figure 2:
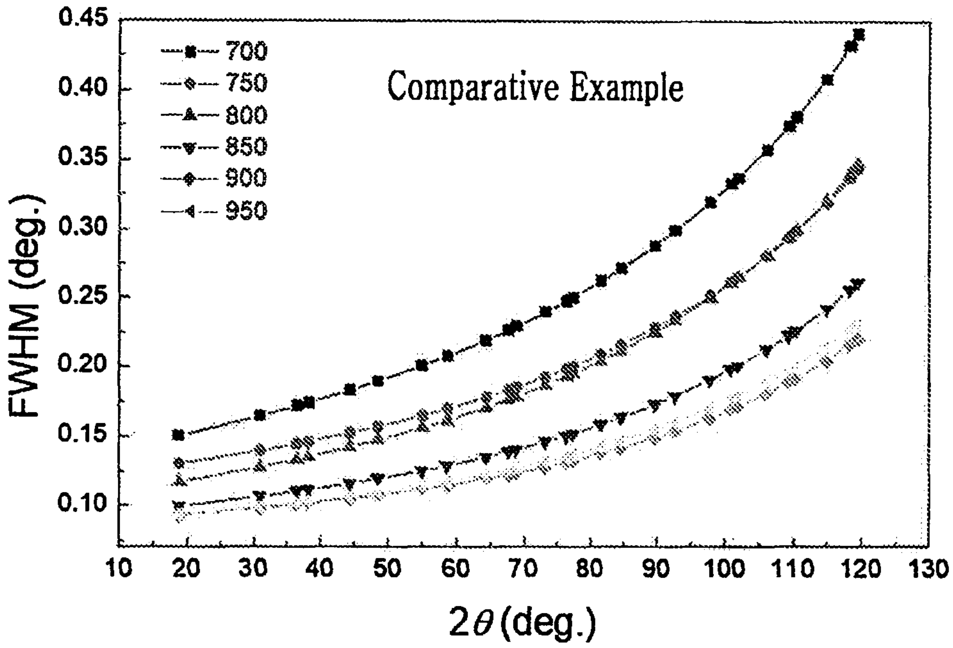
FIG. 2 is a graph showing the full width at half maximum according to the firing temperature of the spinet composite solid solution oxide prepared in comparative examples.
Figure 3:
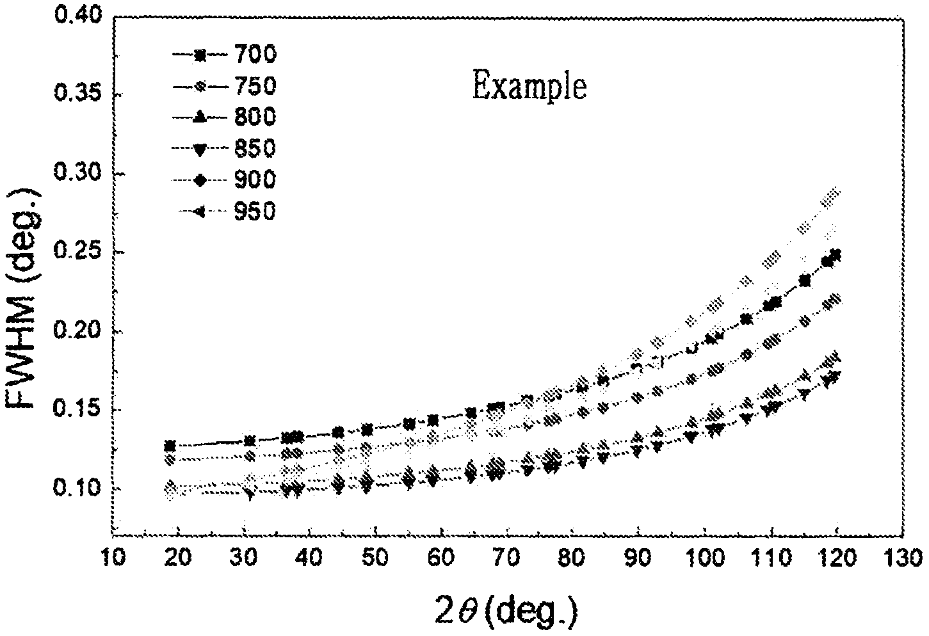
FIG. 3 is a graph showing the full width at half maximum according to the firing temperature of the spinet composite solid solution oxide prepared in examples.
Figure 4:
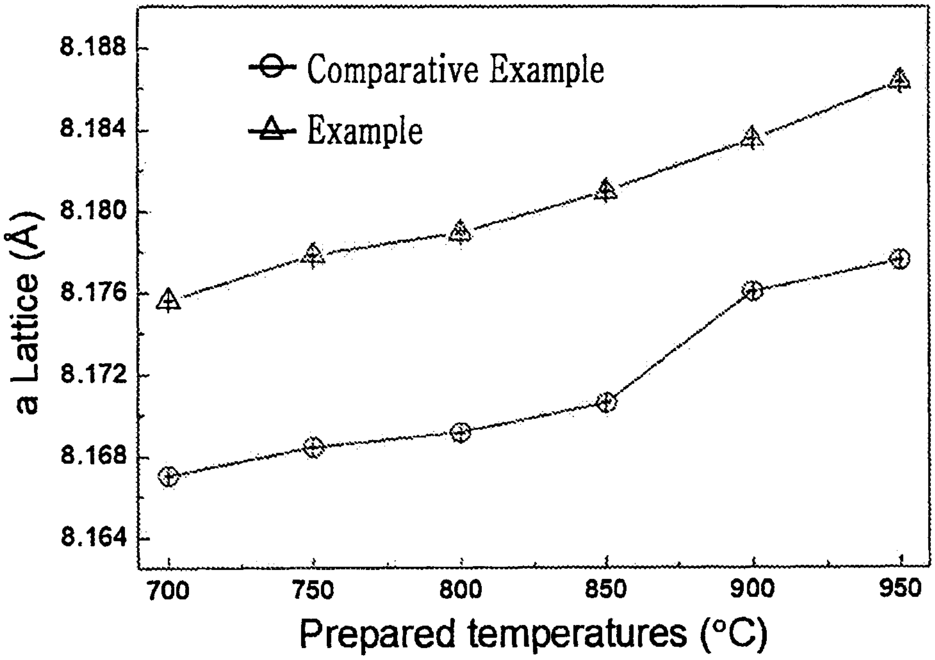
FIG. 4 is a graph showing lattice constants according to the firing temperature of the spinet composite solid solution oxide prepared in examples and comparative examples.
Figure 5:
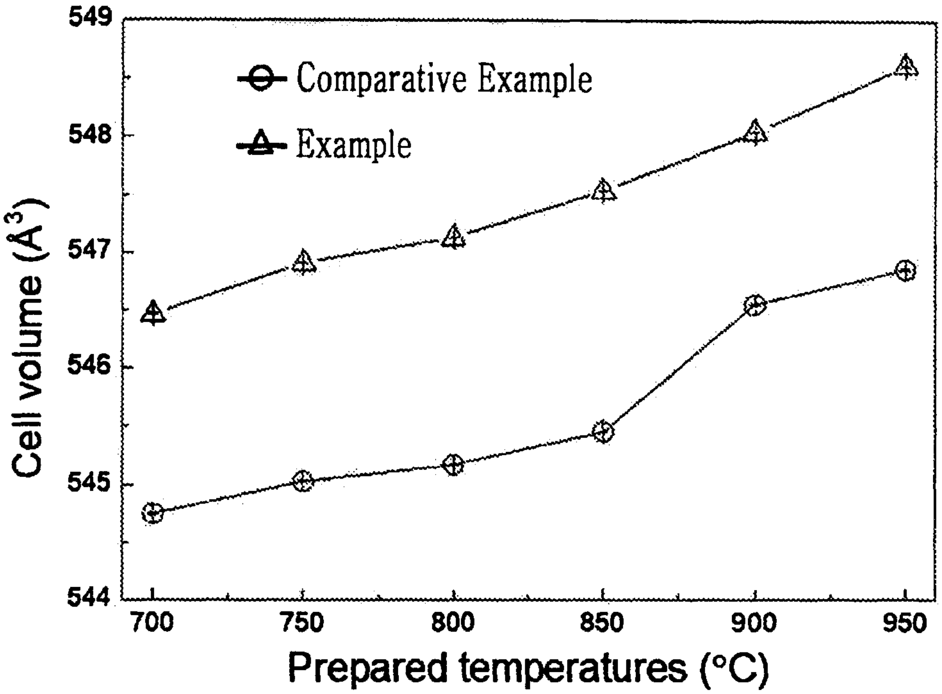
FIG. 5 is a graph showing lattice volumes according to the firing temperature of the spinet composite solid solution oxide prepared in examples and comparative examples.

Hereinafter, embodiments of the present invention are described in detail. However, these embodiments are examples, the present invention is not limited thereto, and the present invention is defined by the scope of claims.

The positive electrode active material according to an embodiment of the present invention includes a spinel composite solid solution oxide represented by Chemical Formula 1.

$$Li_{1+a}Ni_{1/2-x/2}Mn_{3/2-x/2}M_xO_4 \quad \text{[Chemical Formula 1]}$$

In Chemical Formula 1, a may be a mole ratio of lithium (Li), and a content of Li may vary depending on the range of a. a may be $0 \le a \le 0.1$, specifically $0 \le a \le 0.05$. If the Li content is insufficient, crystallinity may decrease and capacity may be reduced, and if the Li content is excessive, a large amount of unreacted water-soluble base remains on the surface of the positive electrode active material, which may make it difficult to control a viscosity during slurry preparation, and excessive carbon dioxide gas may be generated, which may deteriorate battery performance.

The spinel composite solid solution oxide represented by Chemical Formula 1 has improved crystallinity by increasing the synthesis temperature, while the occupancy of impurities is lowered through selection of the type and content of doping elements and changes in the doping process.

For this purpose, the spinel composite solid solution oxide may be doped with any one doping element selected from Co, Mg, Ti, Al, Ba, Cr, Fe, Mo, W, Zr, Y, Nb, and a combination thereof, specifically, may be doped with any one selected from Co, Al, Fe, Ti, and a combination thereof, and more specifically may be doped with Ti.

In particular, when Ti is selected as the doping element, the spinel composite solid solution oxide may be represented by Chemical Formula 2.

$$Li_{1+a}Ni_{1/2-x/2}Mn_{3/2-x/2}Ti_xO_4 \quad \text{[Chemical Formula 2]}$$

As shown in Chemical Formula 2, when Ti is selected as the doping element, a weight of the impurities, lithium nickel oxide ($Li_zNi_{1-z}O$, $0<z\le 0.2$), may be further reduced.

x may be a mole ratio of a doping element and $0<x\le 0.1$ and specifically, $0.025 \le x \le 0.05$. When the doping element has a mole ratio of 0, there may be no effect of reducing a weight of a lithium nickel oxide as an impurity, but when the mole ratio is greater than 0.1, capacity and voltage are deteriorated as Ni and Mn are reduced, producing the impurity.

In addition, the doping element may be substituted at nickel and manganese positions in the same amount (x) as the removed nickel and manganese after removing each equal amount (x/2) of nickel and manganese. Herein, the positive electrode active material may have high tap density and specific surface area, and when a lithium secondary battery is manufactured by using the same, cycle-life characteristics and high rate capability of the battery may be improved.

Specifically, the spinel composite solid solution oxide may have tap density of 1.2 g/cc to 2.5 g/cc and a specific surface area of 0.5 $m^2/g$ to 2.5 $m^2/g$. When the spinel composite solid solution oxide has a tap density of less than 1.2 g/cc, as an electrode becomes thicker, resistance is increased and cell capacity is deteriorated, but when the tap density is greater than 2.5 g/cc, since lithium in the oxide has a longer diffusion distance, a high output electrode is difficult to form. When the spinel composite solid solution oxide has a specific surface area of less than 0.5 $m^2/g$, fast charging characteristics and output characteristics may be deteriorated due to small sites where Li enters and exits, but when the specific surface area is greater than 2.5 $m^2/g$, since the active material has excessive activity with an electrolyte solution and thus increases initial irreversible capacity, a high-capacity battery may be difficult to manufacture.

As impurity occupancy of the spinel composite solid solution oxide is reduced, when the spinel composite solid solution oxide is analyzed by Rietveld analysis in an XRD spectrum, the lithium nickel oxide ($Li_zNi_{1-z}O$, $0<z\le 0.2$) as an oxide impurity has a weight of 0 wt % to 2 wt %, specifically, 0.01 wt % to 2.0 wt %, more specifically, 0.01 wt % to 1.2 wt %, and much more specifically, 0.01 wt % to 1.0 wt %, based on a total weight of the spinel composite solid solution. When the lithium nickel oxide as an impurity has a weight of greater than 2 wt %, there may be cycle-life problems and output deterioration.

The Rietveld analysis method in the XRD spectrum is specifically performed to analyze each crystal structure and occupancy of the lithium nickel oxide through Rietveld analysis of XRD data of the spinel composite solid solution oxide represented by Chemical Formula 1 by using an XRD cell parameter, and a lattice constant obtained by applying a reference material to a JADE Software ICDD (International Centre for Diffraction Data) card.

In addition, when the spinel composite solid solution oxide is analyzed by Rietveld analysis in an XRD spectrum, occupancy of a cubic ($P4_332$) in the crystal calculated by Equation 1 is 0 to 0.1, occupancy of a face-centered cubic (Fd-3m) in the crystal calculated by Equation 2 is 0.9 to 1, and occupancy of impurities (lithium nickel oxide, $Li_zNi_{1-z}O$) in the crystal calculated by Equation 3 is 0 to 0.02.

$$\text{occupancy of cubic } (P4_332) = A_{P4332}/(A_{P4332} + A_{Fd\text{-}3m} + Li_zNi_{1-z}O) \quad \text{[Equation 1]}$$

$$\text{occupancy of face-centered cubic (Fd-3m)} = A_{Fd\text{-}3m}/(A_{P4332} + A_{Fd\text{-}3m} + Li_zNi_{1-z}O) \quad \text{[Equation 2]}$$

$$\text{occupancy of impurities } (Li_zNi_{1-z}O) = Li_zNi_{1-z}O/(A_{P4332} + A_{Fd\text{-}3m} + Li_zNi_{1-z}O) \quad \text{[Equation 3]}$$

In Equations 1 to 3, $A_{P4332}$ is wt % of the cubic ($P4_332$), $A_{Fd\text{-}3m}$ is wt % of the face-centered cubic (Fd-3m), and $Li_zNi_{1-z}O$ is wt % of the impurities ($Li_zNi_{1-z}O$). $A_{P4332}$ and $A_{Fd\text{-}3m}$ may be obtained by analyzing each crystal structure through Rietveld analysis of XRD data of the spinel composite solid solution oxide represented by Chemical Formula 1 by using an XRD cell parameter, and a lattice constant obtained by applying a reference material to a JADE Software ICDD (International Centre for Diffraction Data) card.

When the cubic ($P4_332$) in the spinel composite solid solution oxide crystal has occupancy of greater than 0.1, the face-centered cubic (Fd-3m) in the crystal has occupancy of less than 0.9, or an impurity ($Li_zNi_{1-z}O$) has occupancy of greater than 0.02, rate characteristics may be deteriorated, and a cycle-life may be shortened.

In addition, a lattice constant a (Å) value of a spinel structure of the spinel composite solid solution oxide may be greater than 8.1640 and less than 8.1900, and specifically the lattice constant a (Å) value of a spinel structure may be 8.1810 to 8.1900. If the lattice constant a (Å) value of the spinel structure is less than 8.1640, movement of Li ions may be difficult, and if it exceeds 8.1900, structural stability may be lacking and cycle-life characteristics may be deteriorated.

In addition, the spinel composite solid solution oxide may have a full width at half maximum (FWHM) satisfying Equation 4.

$$0.01 \leq \mathrm{FWHM(deg)} \leq 0.20 ((hkl)=111,\ 2\theta=18 \text{ to } 20),$$

$$0.01 \leq \mathrm{FWHM(deg)} \leq 0.25 ((hkl)=222,\ 2\theta=43 \text{ to } 45). \qquad \text{[Equation 4]}$$

When the spinel composite solid solution oxide has a full width at half maximum of less than 0.01 at ((hkl)=111, 2θ=18 to 20) or less than 0.01 at ((hkl)=222, 2θ=43 to 45), crystallinity becomes excessive, which may limit movement of Li ions and thus deteriorate performance, but when the full width at half maximum is greater than 0.20 at ((hkl) =111, 2θ=18 to 20) or greater than 0.25 at ((hkl)=222, 2θ=43 to 45), the crystallinity of the structure may be deteriorated, thereby deteriorating cycle-life and rate characteristics.

As such, the spinel composite solid solution oxide that contains cubic ($P4_332$) and face-centered cubic (Fd-3m) in an optimized solid solution ratio in the crystal, and that has a low content of lithium nickel oxide ($Li_zNi_{1-z}O$) combined and a positive electrode active material containing the spinel composite solid solution oxide, provides excellent output characteristics while having stable cycle-life characteristics according to the type and content of doping elements replacing transition metals, the synthesis temperature, and the amount of impurities generated.

The method of manufacturing a positive electrode active material according to another embodiment of the present invention provides a method of manufacturing a positive electrode active material including such a spinel composite solid solution oxide.

Specifically, a method for manufacturing a positive electrode active material includes preparing a mixed salt by dry-mixing a manganese salt, a nickel salt, and a lithium salt, preparing a slurry by mixing the mixed salt and a compound containing the doping element with a solvent and then wet-pulverizing the slurry until D50 of solid mixture particles in the slurry becomes 100 nm to 300 nm to prepare a powder, calcining the powder at 400° C. to 600° C. for 4 hours to 12 hours to remove organic materials unnecessary for the reaction, and firing particles formed in the calcining step at 700° C. to 950° C. for 6 hours to 24 hours.

In the preparing of the mixed salt, the compound including the manganese salt, the nickel salt, and the lithium salt and the doping element may be mixed in an equivalent ratio, respectively.

The lithium salt may be any one compound selected from a lithium-containing oxide, hydroxide, nitrate, carbonate, acetate, and a mixture thereof, the manganese salt may be any one compound selected from a manganese-containing oxide, hydroxide, nitrate, carbonate, acetate, and a mixture thereof, and the nickel salt is any one compound selected from a nickel-containing oxide, hydroxide, nitrate, carbonate, acetate, and a mixture thereof, but is not limited thereto.

For example, the lithium salt may be any one compound selected from Li(OH), $Li_2O$, $LiCO_3$, $LINO_3$, $Li_2SO_4$, $LiNO_3$, $CH_3COOLI$, and a mixture thereof, the manganese salt may be any one compound selected from $Mn(OH)_2$, $Mn_3O_4$, $Mn_2O_3$, $MnO_2$, MnOOH, $MnCO_3$, $Mn(NO_3)_2$, $MnSO_4$, $Mn(NO_3)_2$, $Mn(CO_2CH_3)_2$, and a mixture thereof, and the nickel salt may be any one compound selected from $Ni(OH)_2$, NiO, NiOOH, $NiCO_3$, $Ni(NO_3)_2$, $NiSO_4$, $NiC_2O_4$, $Ni(NO_3)_2$, $Ni(CO_2CH_3)_2$, and a mixture thereof.

The compound containing the doping element may be an oxide, a hydroxide, nitrate, a carbonate, an acetate, and a mixture thereof which contain any one doping element selected from Co, Mg, Ti, Al, Ba, Cr, Fe, Mo, W, Zr, Y, Nb, and a combination thereof, but is not limited thereto.

For example, the compound containing the doping element may be any one compound selected from $Al_2O_3$, $TiO_2$, $Co_3O_4$, BaO, $ZrO_2$, and a mixture thereof.

In the preparing of the powder, the mixed salt and the compound including the doping element may be dispersed in a solvent and then mechanically wet-pulverized while applying energy using a media pulverizer such as a bead mill.

Since the wet-pulverizing may uniformly pulverize particles into a nano-size, it is possible to prevent the incorporation of foreign substances that may occur during dry-pulverizing, and the reaction proceeds uniformly during firing process, thereby suppressing the unreacted section of the material as a whole.

The wet-pulverizing may be performed using a bead mill, and the bead mill may use a hydrostatic, horizontal, or basket.

As a solvent used for wet-pulverizing, various organic solvents and aqueous solvents may be used, and water may be used as an example. The total weight of the various metal salts may be 50 wt % to 60 wt % based on the total weight of the slurry.

The wet-pulverizing may be performed until the D50 of the solid mixture particles in the slurry becomes 100 nm to 500 nm, and specifically, it may be performed until the D50 becomes 300 nm to 400 nm. When wet-pulverized, the solid mixture particles have D50 of less than 100 nm, a synthesized material has so small particles as to deteriorate cycle-life characteristics, but when D50 is greater than 500 nm, a non-uniform reaction may occur too easily to obtain a uniform phase, deteriorating crystallinity during the synthesis.

The liquid mixture prepared through the wet-pulverizing may be powdered in a heat-drying method, a hot-air drying method, a spray-drying method, or a freeze-drying method.

The firing of the manufactured powder may be performed by putting the metal powder in an electric furnace and heat-treating it in an atmospheric atmosphere, a nitrogen ($N_2$) gas atmosphere, or an oxygen ($O_2$) gas atmosphere. Specifically, in the calcining process performed at 400° C. to 600° C. for 4 to 12 hours, organic materials unnecessary for the reaction are removed, and the present firing may be carried out at 700° C. to 950° C. for 6 hours to 24 hours.

Herein, the firing may be performed at 700° C. to 950° C., specifically, 800° C. to 950° C., and more specifically, 900° C. to 950° C. When the firing temperature is less than 700° C., insufficient thermal energy required for the reaction may results in insufficient crystal growth and thus a small crystal size and an excessively large specific surface area, but when the firing temperature is greater than 950° C., primary particles are excessively grown, an irregular reaction may occur due to excessive oxygen deficiency, and in addition, partial or total amorphization may occur, thereby deteriorating electrochemical performance.

After the firing process, the method may further include annealing at 400° C. to 700° C. In the case of annealing, oxygen deficiency occurring during high-temperature firing may be reduced, crystals may be stabilized, and electrochemical characteristics may be improved.

The fired powder goes through a classification and classification process, and the size of the filter used in the classification process may be 250 mesh to 350 mesh. In addition, the prepared powder includes secondary particles in which primary particles having an average particle diameter of 100 nm to 500 nm are aggregated.

An average particle diameter of the secondary particles may be adjusted to 1 micrometer to 30 micrometers, specifically 5 micrometers to 20 micrometers, more specifically 5 micrometers to 15 micrometers, even more specifically 5 micrometers to 10 micrometers. When the average particle diameter of the secondary particles of the positive electrode active material is 1 micrometer to 30 micrometers, stability during electrode coating is increased, and generation of particulates may be minimized, so that safety and output characteristics of the battery may be improved.

As described above, the method of manufacturing a positive electrode active material according to an embodiment of the present invention is to prepare a high voltage spinel composite solid solution oxide by dry solid-mixing various metal salts in an equivalence ratio, wet-pulverizing the mixture, and then, drying and firing it to relatively easily control a solid solution ratio of a crystal structure and a mixing ratio of a lithium nickel oxide.

Another embodiment of the present invention provides a lithium secondary battery including a positive electrode including such a positive electrode active material, a negative electrode including a negative electrode active material, and an electrolyte between the positive electrode and the negative electrode.

Since the lithium secondary battery may adopt any configuration of a conventional general lithium secondary battery except for including the positive electrode active material according to an embodiment of the present invention as a positive electrode active material, a detailed description thereof will be omitted.

DETAILED DESCRIPTION OF THE EMBODIMENTS

Hereinafter, examples and comparative examples of the present invention are described. However, the examples are only one example of the present invention, and the present invention is not limited to the embodiment.

Preparation Example 1: Preparation of Spinel Composite Solid Solution Oxide

Examples 1 to 6

$Mn_2O_3$ as a manganese salt, $Ni(OH)_2$ as a nickel salt, and $Li_2CO_3$ as a lithium salt in each equivalence ratio were mixed, and a doping element was mixed with the mixture in each equivalence ratio, and each dry mixture obtained therefrom was wet-pulverized in an aqueous solution with bead mills until D50 became 100 nm to 300 nm. Subsequently, powders dried with hot air were put in an electric furnace, and fired at various temperatures, preparing spinel composite solid solution oxides represented as shown in Table 1.

TABLE 1

| | Firing temperature (° C.) | Spinel composite solid solution oxide |
|---|---|---|
| Example 1 | 700 | $LiNi_{0.475}Ti_{0.05}Mn_{1.475}O_4$ |
| Example 2 | 750 | $LiNi_{0.475}Ti_{0.05}Mn_{1.475}O_4$ |
| Example 3 | 800 | $LiNi_{0.475}Ti_{0.05}Mn_{1.475}O_4$ |
| Example 4 | 850 | $LiNi_{0.475}Ti_{0.05}Mn_{1.475}O_4$ |
| Example 5 | 900 | $LiNi_{0.475}Ti_{0.05}Mn_{1.475}O_4$ |
| Example 6 | 950 | $LiNi_{0.475}Ti_{0.05}Mn_{1.475}O_4$ |

Comparative Examples 1 to 6

As a comparative example for comparison with the examples, a conventionally known equivalent ratio of a spinel composite solid solution oxide was selected.

$Mn_2O_3$ as a manganese salt, $Ni(OH)_2$ as a nickel salt, and $Li_2CO_3$ as a lithium salt were mixed in each equivalence ratio. Herein, none except for Ni and Mn was doped. The mixture was wet-pulverized with bead mills, until D50 became 100 nm to 300 nm. Subsequently, powders obtained by drying with hot air were put in an electric furnace and fired at various temperatures, preparing spinel composite solid solution oxides represented as shown in Table 2.

TABLE 2

| | Firing temperature (° C.) | Spinel composite solid solution oxide |
|---|---|---|
| Comparative Example 1 | 700 | $LiNi_{0.5}Mn_{1.5}O_4$ |
| Comparative Example 2 | 750 | $LiNi_{0.5}Mn_{1.5}O_4$ |
| Comparative Example 3 | 800 | $LiNi_{0.5}Mn_{1.5}O_4$ |
| Comparative Example 4 | 850 | $LiNi_{0.5}Mn_{1.5}O_4$ |
| Comparative Example 5 | 900 | $LiNi_{0.5}Mn_{1.5}O_4$ |
| Comparative Example 6 | 950 | $LiNi_{0.5}Mn_{1.5}O_4$ |

Experimental Example 1: XRD Measurement

The spinel composite solid solution oxides according to the examples and the comparative examples were measured with respect to X-ray diffraction pattern with an X-ray diffraction analyzer (Rint-2000, Rigaku Corp., Japan) to calculate 2θ of a peak indicating maximum intensity and the corresponding intensity, which were applied to a JADE Software ICDD (International Centre for Diffraction Data) card to measure a lattice constant on XRD and a concentration of a lithium nickel oxide, a full width at half maximum, and a lattice constant through a Rietveld analysis, and the results are shown in Tables 3 and 4 and FIGS. 1 to 5.

TABLE 3

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Firing temperature (° C.) | | 700 | 750 | 800 | 850 | 900 | 950 |
| Impurities | $Li_xNi_{1-x}O$ (wt %) | 1.35 | 1.01 | 1.39 | 1.58 | 1.67 | 2.78 |
| Lattice | lattice constant | 8.167 | 8.168 | 8.169 | 8.171 | 8.176 | 8.178 |

TABLE 3-continued

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| size | a (Å) | | | | | | |
| | Cell Volume Size ($Å^3$) | 544.746 | 545.016 | 545.164 | 545.439 | 546.537 | 546.850 |

TABLE 4

| | | Ex. 1 | Ex. 2 | Ex. 3 | Ex. 4 | Ex. 5 | Ex. 6 |
|---|---|---|---|---|---|---|---|
| Firing temperature (° C.) | | 700 | 750 | 800 | 850 | 900 | 950 |
| Impurities | $Li_xNi_{1-x}O$(wt %) | 1.15 | 0.56 | 0.43 | 0.35 | 0.38 | 0.16 |
| Lattice size | lattice constant a (Å) | 8.176 | 8.178 | 8.179 | 8.181 | 8.184 | 8.186 |
| | Cell Volume Size ($Å^3$) | 546.454 | 546.903 | 547.117 | 547.530 | 548.036 | 548.589 |

Table 3 shows numerical values of the XRD results of the comparative examples in an experiment of performing the firing at every temperature, which were diagramed in FIGS. 1, 2, 4, and 5.

Referring to Table 3 ad FIGS. 1, 2, 4, and 5, as the firing temperature was increased, a full width at half maximum decreased, thereby contributing to improvement of crystallinity but increasing oxygen deficiency and thus increasing a lithium nickel oxide, an impurity.

Table 4 provides numerical values of the XRD results of the examples doped with Ti at the positions of Ni and Mn in the experiment of performing the firing at every temperature, and FIGS. 1, 3, 4, and 5 show diagrams thereof.

Referring to Table 4 and FIGS. 1, 3, 4, and 5, in the examples unlike the comparative examples, as a temperature increased, crystallinity was not only improved, but also a lithium nickel oxide was reduced.

Production Example 2: Preparation of Lithium Secondary Battery 10.68 g (89 wt % of the total composition) of each spinel composite solid solution oxide according to the examples and the comparative examples, 0.84 g (7 wt % of the total composition) of Super-P, and 6 wt % 8 g (4 wt % of the total composition) of HSV900 as a binder were uniformly mixed, and 15 g of NMP as a solvent was added thereto and then, uniformly mixed and then, coated on an aluminum thin plate (Al Foil) and dried, manufacturing a positive electrode.

The manufactured positive electrode, lithium metal as a counter electrode, and a porous polyethylene film as a separator were used with a liquid electrolyte solution prepared by adding 1.2 mol $LiPF_6$ of a solute to a mixed solvent of EC (ethylene carbonate) and DEC (diethyl carbonate), manufacturing a 2016 standard coin cell according to a common process of manufacturing a lithium secondary battery cell.

Experimental Example 2: Evaluation of Battery Characteristics

In order to evaluate characteristics of the lithium secondary battery cell of Preparation Example 2, an electrochemical analyzer (WBCS3999K 32, Woori Engineering) was used at room temperature to check battery capacity by 3 cycles charging and discharging the cell at 0.1 C in a voltage range of 3.0 V to 4.9 V, a battery cycle-life was checked by 250 cycles charging and discharging the cell at 1 C in a voltage range of 3.0 V to 4.9 V, and output characteristics (rate) of the cell were evaluated by checking discharge capacity in a voltage range of 3.0 V to 4.9 V from 0.1 C to 10 C, and the results are shown in Tables 5 and 6 and FIGS. 6 to 11.

TABLE 5

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Firing temperature (° C.) | | 700 | 750 | 800 | 850 | 900 | 950 |
| Formation | 1st Discharge Capacity | 115.3 | 118.6 | 119.4 | 125.5 | 123.3 | 121.3 |
| | 3rd Discharge Capacity | 118.7 | 118.7 | 124.3 | 130 | 128.3 | 127.3 |
| Cycle | Retention 1 C Cycle | 78.2% | 79.1% | 86.2% | 91.9% | 94.6% | 87.6% |
| C-rate | 0.1 C | 100.0% | 100.0% | 100.0% | 100.0% | 100.0% | 100.0% |
| | 0.2 C | 96.6% | 98.2% | 98.3% | 99.6% | 103.9% | 99.9% |
| | 0.5 C | 84.9% | 86.7% | 90.9% | 96.1% | 102.8% | 97.6% |
| | 1 C | 74.1% | 75.4% | 82.9% | 90.3% | 99.2% | 94.2% |
| | 2 C | 63.7% | 64.6% | 74.2% | 82.9% | 93.8% | 88.5% |
| | 3 C | 57.0% | 57.9% | 68.8% | 78.2% | 89.7% | 83.8% |
| | 5 C | 48.7% | 50.2% | 62.2% | 71.5% | 83.2% | 76.9% |
| | 10 C | 26.8% | 28.7% | 53.3% | 60.6% | 68.8% | 63.6% |

TABLE 6

| | | Ex. 1 | Ex. 2 | Ex. 3 | Ex. 4 | Ex. 5 | Ex. 6 |
|---|---|---|---|---|---|---|---|
| Firing temperature (° C.) | | 700 | 750 | 800 | 850 | 900 | 950 |
| Formation | 1st Discharge Capacity | 112.2 | 116.7 | 123.0 | 127.1 | 132.0 | 134.3 |
| | 3rd Discharge Capacity | 114.5 | 116.9 | 124.1 | 126.7 | 131.7 | 133.5 |
| Cycle | Retention 1 C Cycle | 67.0% | 70.7% | 73.5% | 78.3% | 84.6% | 89.6% |
| C-rate | 0.1 C | 100.0% | 100.0% | 100.0% | 100.0% | 100.0% | 100.0% |
| | 0.2 C | 98.2% | 97.3% | 99.3% | 99.0% | 100.0% | 99.9% |
| | 0.5 C | 93.2% | 91.5% | 96.6% | 96.3% | 98.1% | 99.6% |
| | 1 C | 88.6% | 88.8% | 93.6% | 93.6% | 96.6% | 99.2% |
| | 2 C | 81.6% | 84.0% | 88.6% | 89.3% | 93.6% | 96.3% |
| | 3 C | 76.7% | 81.5% | 85.1% | 86.0% | 91.4% | 94.4% |
| | 5 C | 68.7% | 75.1% | 79.3% | 80.8% | 87.2% | 90.3% |
| | 10 C | 50.5% | 57.2% | 68.0% | 71.6% | 77.9% | 79.2% |

Figure 6:
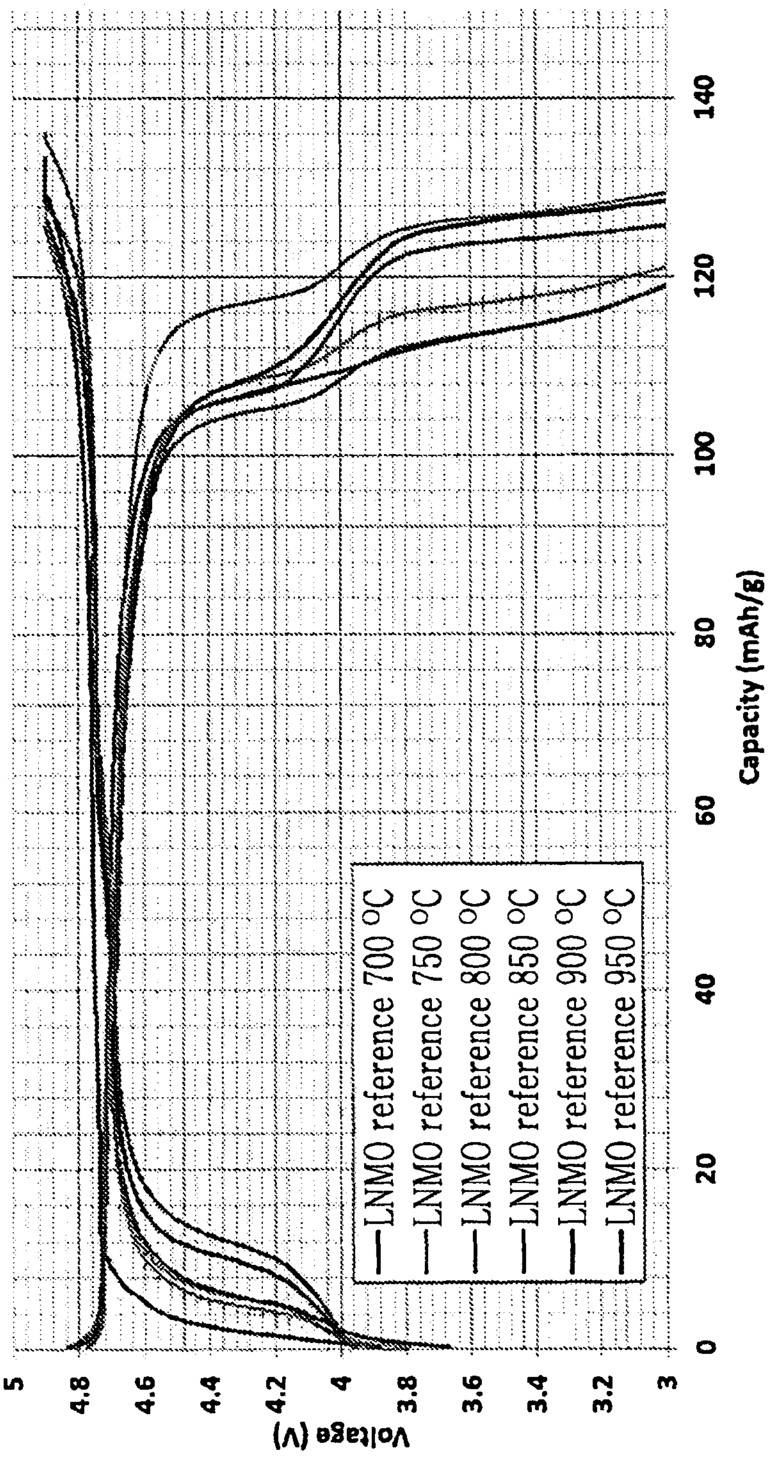
FIG. 6 is a graph showing charge and discharge curves at 0.1 C of the battery including the spinel composite solid solution oxide prepared in comparative examples.
Figure 7:
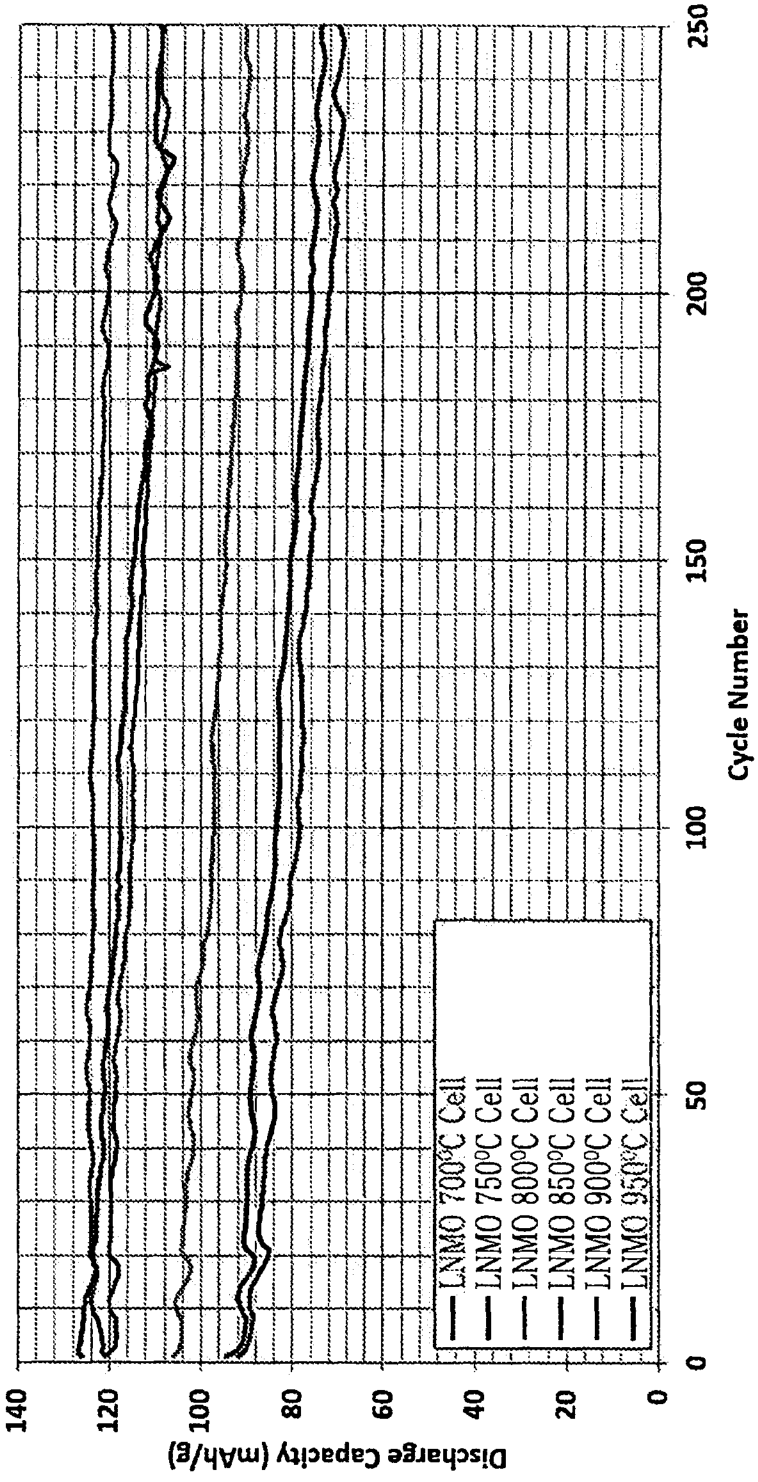
FIG. 7 is a graph showing cycle-life characteristics of the battery cells including the spinet composite solid solution prepared in comparative examples.
Figure 8:
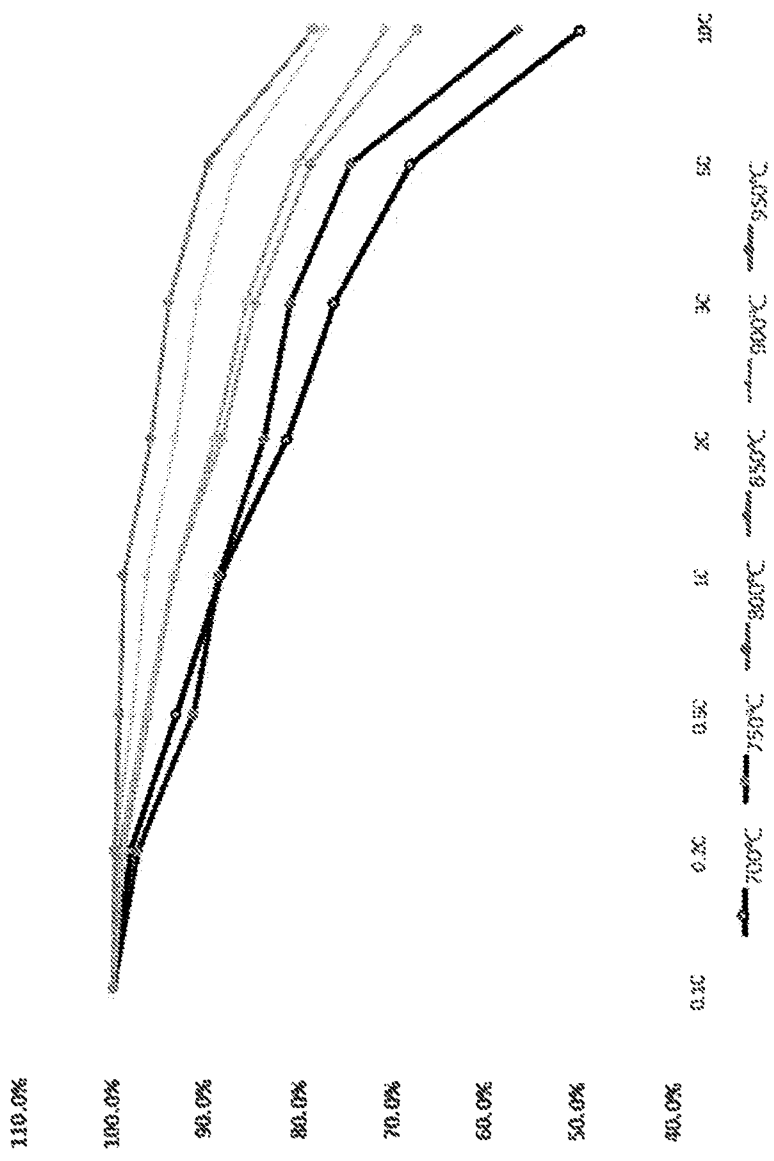
FIG. 8 is a graph showing the rate characteristics of the battery cells including the spinet composite solid solution oxide prepared in comparative examples.

Table 5 shows numerical values of electrochemical analysis results of coin cells manufactured by using the spinel composite solid solution oxides according to the comparative examples, and diagrams thereof are shown in FIGS. 6 to 8.

Referring to Table 5 and FIGS. 6 to 8, as a firing temperature increased, efficiency of retention at 1 C cycle increased. Based on Table 3 and FIG. 2, as crystallinity increased, cycle-life was improved through structural stabilization.

Output characteristics were improved at a high rate, but 70% or more performance at 10 C, compared to 0.1 C, was not obtained.

In addition, at 0.1 C discharge capacity, capacity was sharply decreased from 900° C. The reason is that impurity (lithium nickel oxide) increased as the firing temperature increased and thus failed in exceeding output limit.

Figure 9:
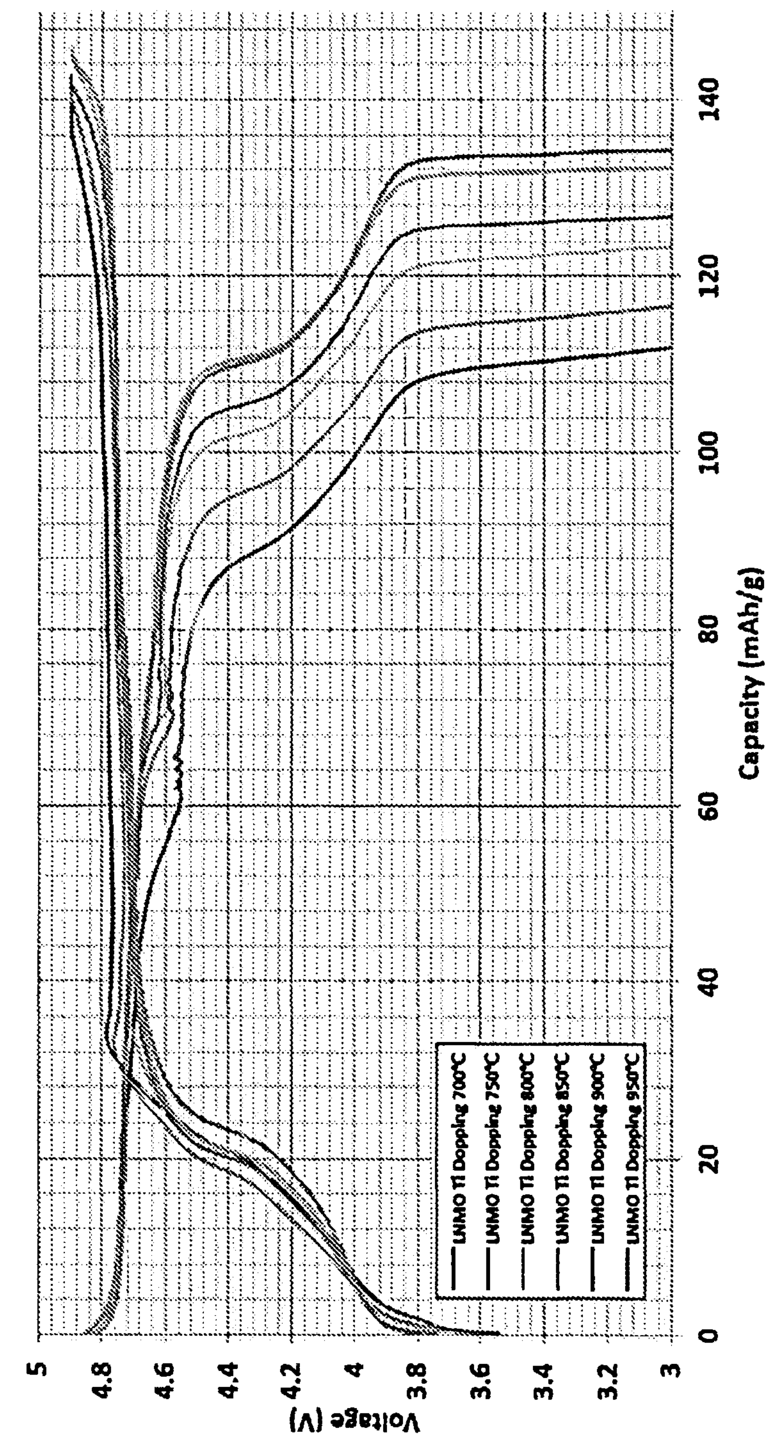
FIG. 9 is a graph showing charge and discharge curves at 0.1 C of the battery cells including the spinel composite solid solution oxide prepared in examples.
Figure 10:
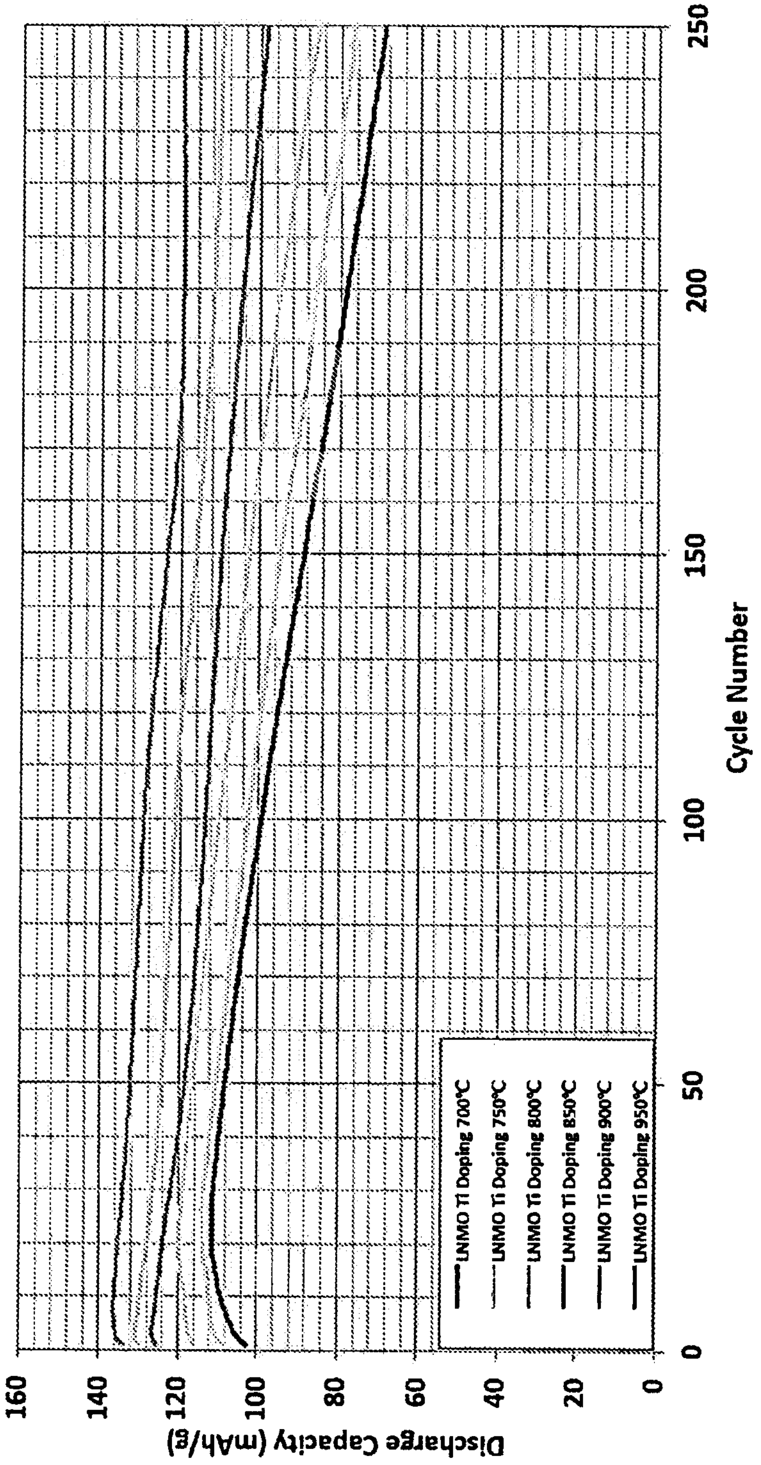
FIG. 10 is a graph showing cycle-life characteristics of the battery cells including the spinel composite solid solution prepared in examples.
Figure 11:
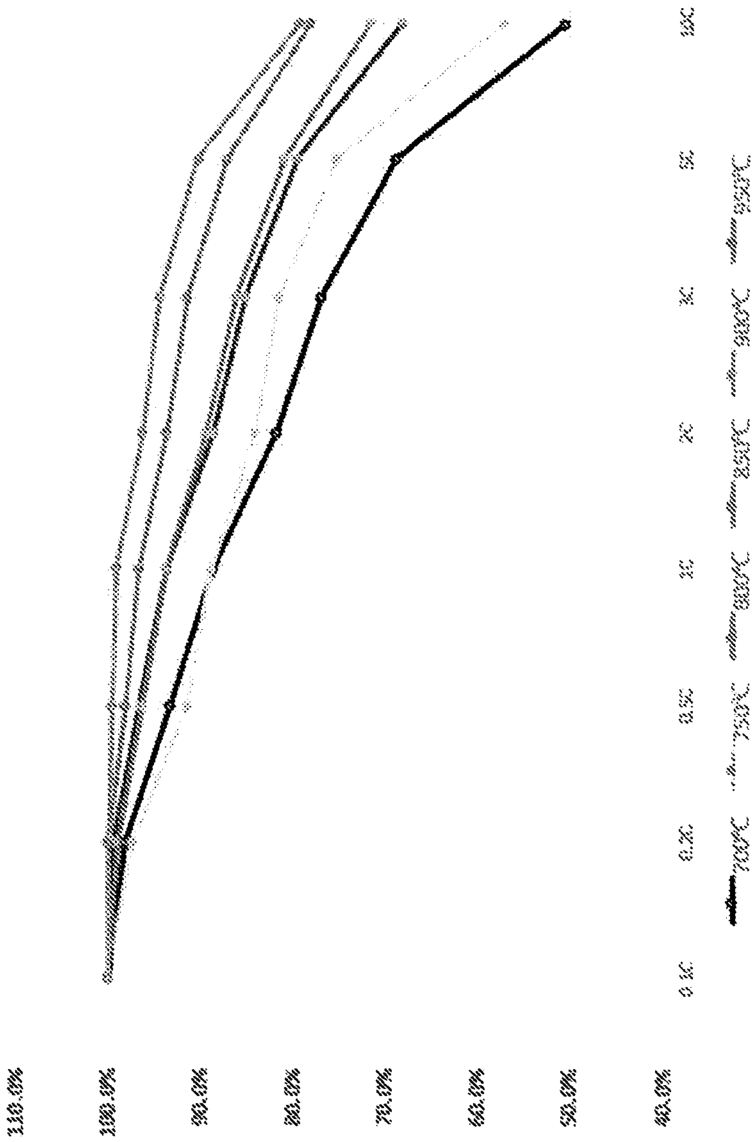
FIG. 11 is a graph showing rate characteristics of the battery cells including the spinel composite solid solution prepared in examples.

Table 6 shows numerical values of electrochemical analysis result of the coin cells manufactured by using the spinel composite solid solution oxides prepared in the examples, and diagrams thereof are shown in FIGS. 9 to 11.

Referring to Table 6 and FIGS. 9 to 11, as the firing temperature increased, efficiency of 1 C retention cycle increased, like the comparative examples. Based on Table 3 and FIG. 3, cycle-life was improved through structural stabilization, as crystallinity increased.

In addition, output characteristics at a high rate were improved, and specifically, 10% to 15% more excellent output characteristics at a high rate were achieved than the comparative examples. The examples, unlike the comparative examples, as shown in Table 4 and FIG. 2, maintained high crystallinity (full width at half maximum) by doping Ti at a firing temperature of 900° C. or higher, which increased a lattice constant and a cell volume without deteriorating a cycle-life and thus increased a diffusion rate of lithium (Li), maintaining excellent high rate characteristics and sufficient cycle-life characteristics.

The examples exhibited that 0.1 C discharge capacity was also about 5% increased at 900° C. or higher, wherein as a firing temperature increased, impurity (lithium nickel oxide) was reduced unlike the comparative examples.

Accordingly, in a positive electrode active material having a lithium nickel oxide, a lattice constant, and a full width at half maximum controlled within the ranges of the present invention, the highest capacity and output characteristics and satisfactory cycle-life characteristics were achieved.

Although preferred embodiments of the present invention have been described in detail above, the scope of the present invention is not limited thereto, and various modifications and improvements by those skilled in the art using the basic concept of the present invention as defined in the following claims are also within the scope of the present invention.

INDUSTRIAL APPLICABILITY

The present invention relates to a cathode active material containing a high voltage spinel composite solid solution oxide having a discharge voltage of 4.5 V or more, a method for manufacturing same, and a lithium secondary battery including the same. The positive electrode active material containing a spinel composite solid solution oxide may increase the synthesis temperature to improve crystallinity and lowering the occupancy of impurities and thus provide stable cycle-life and excellent high output characteristics.

The invention claimed is:

1. A method of manufacturing a positive electrode active material containing a spinel composite solid solution oxide represented by Chemical Formula 1, comprising preparing a mixed salt by dry-mixing a manganese salt, a nickel salt and a lithium salt, preparing a slurry by mixing the mixed salt and a compound containing the doping element with a solvent and then wet-pulverizing the slurry until D50 of solid mixture particles in the slurry becomes 100 nm to 300 nm to prepare a powder, calcining the powder at 400° C. to 600° C. for 4 hours to 12 hours to remove organic materials unnecessary for the reaction, and firing particles formed in the calcining step at 700° C. to 950° C. for 6 hours to 24 hours:

$$Li_{1+a}Ni_{1/2-x/2}Mn_{3/2-x/2}M_xO_4 \quad \text{[Chemical Formula 1]}$$

wherein, in Chemical Formula 1,

M is any one doping element selected from Co, Mg, Ti, Al, Ba, Cr, Fe, Mo, W, Zr, Y, Nb, and a combination thereof, $0 \le a \le 0.1$ and $0 < x \le 0.1$.

2. The method of claim 1, wherein the lithium salt is any one compound selected from a lithium-containing oxide, hydroxide, nitrate, carbonate, acetate, and a mixture thereof, the manganese salt is any one compound selected from a manganese-containing oxide, hydroxide, nitrate, carbonate, acetate, and a mixture thereof, and the nickel salt is any one compound selected from nickel-containing oxide, hydroxide, nitrate, carbonate, acetate, and a mixture thereof.

3. The method of claim 1, wherein the compound containing the doping element is an oxide, a hydroxide, nitrate, a carbonate, an acetate, and a mixture thereof which contain any one doping element selected from Co, Mg, Ti, Al, Ba, Cr, Fe, Mo, W, Zr, Y, Nb, and a combination thereof.

4. The method of claim 1, wherein the positive electrode active material includes secondary particles having an average particle diameter of 5 micrometers to 30 micrometers, which are formed by aggregating primary particles having an average particle diameter of 100 nm to 500 nm.

* * * * *